Aug. 26, 1941. H. T. RICHARDSON 2,253,916
CLIP FASTENER FOR CORRUGATED SHEETS
Filed Sept. 10, 1940
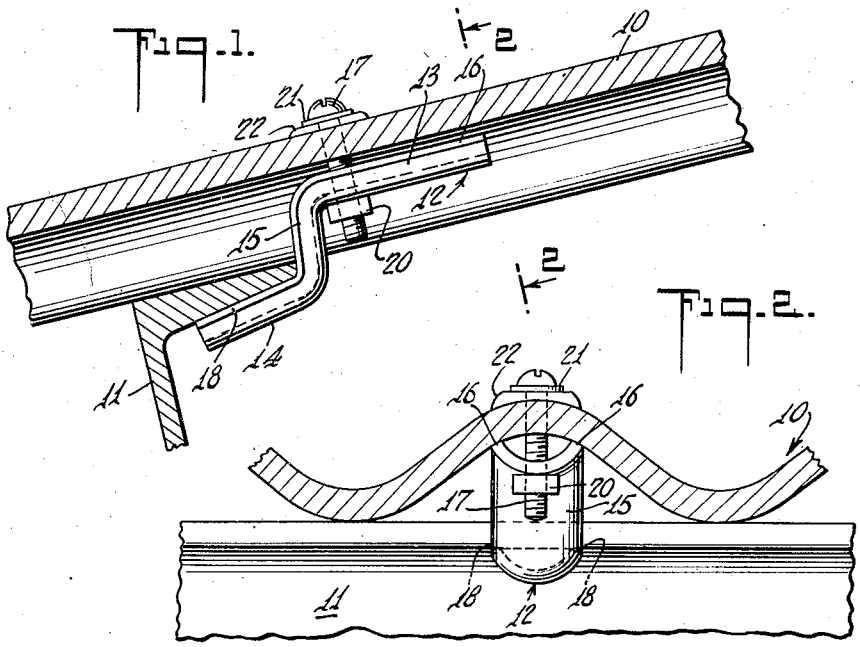
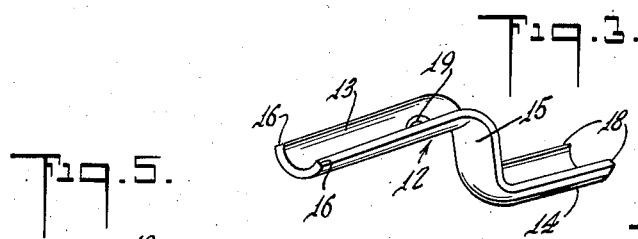
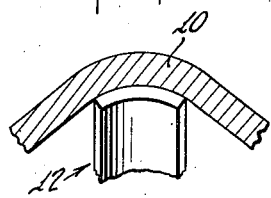
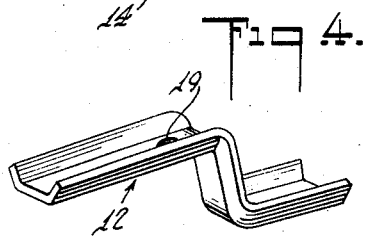
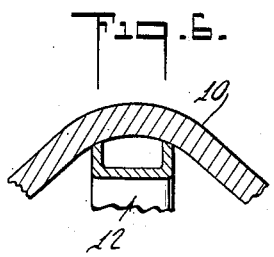
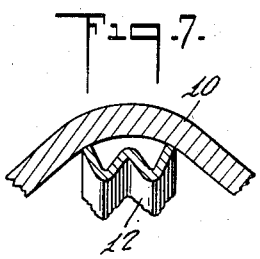
INVENTOR
HARLOW T. RICHARDSON.
BY
ATTORNEY Patented Aug. 26, 1941

2,253,916

UNITED STATES PATENT OFFICE 2,253,916

CLIP FASTENER FOR CORRUGATED SHEETS

Harlow T. Richardson, North Plainfield, N. J., assignor to The Ruberoid Co., New York, N. Y., a corporation of New Jersey Application September 10, 1940, Serial No. 356,161

3 Claims. (Cl. 189—35)

This invention relates to clip fasteners for securing corrugated sheets, particularly corrugated asbestos-cement sheets, to the metal purlins of the skeleton frame work of roofs and sidewalls of buildings, especially industrial buildings such as factories, warehouses and the like.

Corrugated asbestos-cement sheets are extensively used as roofings and sidings of such structures because of the fact that they are fireproof, weather-proof, resistant to corrosion, relatively light in weight, economical, easily applied, and pleasing in appearance.

There has long been need for a simple, inexpensive, and strong clip for fastening corrugated asbestos-cement sheets to metal supports or purlins, such as channels, angles, and I-beams, particularly where the flanges of the supporting members point up.

The clips that have heretofore been used for this purpose generally have been made of stamped flat metal and of more or less complicated design. In many cases they require the use of two fastening bolts, thus increasing the cost of application as well as the cost of the clip. Except with certain clips of complicated design, the bolts are so far removed from the support that the resultant fastening is weak. Another objectionable feature is that the sharp edges of such clips rest against the asbestos-cement sheets which may be injured thereby.

It is the general object of my invention to provide an improved clip fastener which overcomes these objections. A more specific object is to provide an improved clip fastener which has great strength and rigidity and has a high section modulus.

Another object is to provide a clip fastener that may be easily applied with a single bolt by relatively unskilled applicators without the use of any special tools.

A further object is to provide a clip fastener that may be bolted to the corrugated sheet at a point so close to the supporting member as to insure ample strength and rigidity of the assembly.

According to my invention, I provide a clip fastener of non-planar transverse cross-section throughout its length which is highly resistant to bending.

Other objects and advantages of the invention will appear from the following description thereof, reference being had to the accompanying drawing in which:

Figure 1 is a side view of a preferred form of clip in applied position, the supporting member and the corrugated sheet being shown in section;

Fig. 2 is a cross-sectional view taken on the line 2—2 of Figure 1;

Fig. 3 is a perspective view of the preferred form of clip fastener;

Fig. 4 is a similar view of a modified form of clip fastener; and

Figs. 5, 6 and 7 are cross-sectional fragmentary views of other modified forms.

Having reference now to the drawing, and particularly Figs. 1 and 2 thereof, 10 indicates a corrugated asbestos-cement roofing sheet, and 11 represents a metal supporting member on which the corrugated sheet is supported and to which it is secured by the clip fastener 12 of this invention.

While I have described the invention with particular reference to its application to roofing sheets, it is to be understood that the clips may also be used to fasten sidings.

It will be observed that the flange of the supporting member 11, which member may be a channel, angle, I-beam, or like structural element, points upward at the angle of the pitch of the roof. While the improved clip is particularly designed for use with supporting members having upwardly pointing flanges, it is to be understood that the invention is not necessarily limited in this respect.

The clip fastener 12 is made of a single piece of steel or other suitable metal, preferably galvanized, which is of concave or incurved transverse cross-section throughout its entire length. The metal piece is bent or shaped to form two off-set oppositely extending legs 13 and 14 and a connecting portion 15, as shown in Fig. 3. It will be noted that all of these parts are non-planar in transverse cross-section throughout, thus forming a structure of great rigidity and strength. Further to enhance the strength and rigidity of the structure, it will be seen on reference to Fig. 2 that the sides of the concave sheet-supporting leg 13 of the clip extend at right angles or perpendicular to the oppositely inclined walls of the corrugation in which said leg is set, and that they terminate in inclined plane surfaces 16 upon which the corrugated sheet rests.

In the applied position of the fastener, the inclined faces 16 of the upper leg 13 rest approximately flush against the underside of the corrugated sheet 10. Since the faces 16 are smooth and are inclined to correspond to the angle of the corrugations, they afford extended bearing surfaces which will not injure the covering sheet when the bolt 17 is tightened. The edges 18 of the lower leg 14 bear against the underside of the flange of the support 11.

The leg 13 has an opening 19 for passage of the bolt 17. This opening is located as closely as possible to the connecting portion 15, being spaced therefrom only a distance sufficient to permit of screwing the nut 20 tightly on the threaded end of the bolt. Since the bolt is located close to the support 11, the clip leg 14 has only a very short effective leverage or bending moment, thus increasing the strength of the assembly and preventing dislodgment of the covering sheet by wind pressure.

The bolt 17 is preferably provided with the usual flat steel washer 21 and concave lead washer 22. The latter serves as a cushion between the bolt and the corrugated sheet.

In the modification shown in Fig. 4, the clip 12, instead of being concavely curved in transverse cross-section, has a transverse section substantially in the form of a truncated V. Fig. 6 shows a clip of substantially U-shaped transverse section, while Fig. 7 shows one that is substantially W-shaped in section.

Fig. 5 shows a clip that is convexly curved in transverse cross-section. In the use of a clip of this form the concave surfaces of the two legs of the clip contact the undersides of the corrugated sheet and the support, respectively.

The various forms of the clip herein described have a common characteristic in that they are non-planar in transverse cross-section throughout their length, that is to say, both legs as well as the connecting portion of the clips are not flat in section.

While I have illustrated several embodiments of the invention, it will be understood that it may be embodied in forms other than those shown.

What I claim is:

1. A clip fastener for securing a corrugated asbestos-cement sheet to a support, comprising two oppositely directed legs and a connecting portion, all of substantially uniform non-planar cross-section throughout, one of said legs being adapted to engage the support, the other of said legs being adapted to bear against the corrugated sheet and having upwardly diverging side portions disposed in planes substantially perpendicular to the oppositely inclined walls of the corrugations of the sheet.

2. A clip fastener for securing a corrugated asbestos-cement sheet to a support, comprising two oppositely directed legs and a connecting portion, all of substantially uniform non-planar cross-section throughout, one of said legs being adapted to engage the support, the other of said legs being adapted to bear against the corrugated sheet and having upwardly diverging side portions disposed in planes substantially perpendicular to the oppositely inclined walls of the corrugations of the sheet, said side portions terminating in inclined faces that correspond substantially to the angle of the corrugations against which they are adapted to bear.

3. A structural assembly comprising corrugated asbestos-cement sheets, supports for the sheets, and clips for securing the sheets to the supports, each clip having two offset legs and a connecting portion, one of said legs engaging the under surface of a support, the other leg being set in a corrugation and having upwardly diverging side portions disposed in planes substantially perpendicular to the walls of the corrugation, said side portions having inclined upper faces providing extending bearing surfaces upon which the corrugation rests, each clip being secured to the corrugated sheet by a single bolt passing through the sheet and its contacting clip-leg at a point close to the support.

HARLOW T. RICHARDSON.